United States Patent [19]

Murakami et al.

[11] 4,248,848
[45] Feb. 3, 1981

[54] DIHYDRATE OF CALCIUM HYPOCHLORITE AND METHOD FOR MANUFACTURE THEREOF

[75] Inventors: Tsugio Murakami; Mitsuo Kikuchi; Kazushige Igawa, all of Shinnanyo, Japan

[73] Assignee: Toyo Soda Manufacturing Co., Ltd., Shinnanyo, Japan

[21] Appl. No.: 16,981

[22] Filed: Mar. 2, 1979

[30] Foreign Application Priority Data

Mar. 6, 1978 [JP] Japan ................................. 53-24576
Mar. 29, 1978 [JP] Japan ................................. 53-35357

[51] Int. Cl.³ ...................... C01B 11/04; C01F 11/44
[52] U.S. Cl. ..................................... 423/474; 23/301; 23/304
[58] Field of Search .................. 423/265, 474; 23/300, 23/304, 301

[56] References Cited

U.S. PATENT DOCUMENTS 2,642,335  6/1953  May ..................................... 423/266
3,796,794  3/1974  Ilardi ................................... 423/266

FOREIGN PATENT DOCUMENTS 1131090  10/1968  United Kingdom ...................... 423/474

OTHER PUBLICATIONS

Pamplin, B. *Crystal Growth*, Pergamon Press, N.Y., 1974, pp. 300–303.

*Primary Examiner*—Brian E. Hearn
*Attorney, Agent, or Firm*—Armstrong, Nikaido, Marmelstein & Kubovcik

[57] ABSTRACT

A dihydrate of calcium hypochlorite of a prismatic crystal shape in which the lengths of axes a, b and c thereof are in the ratios satisfying the following formulas (1), (2) and (3):

$$0.5 \leq b/a \leq 2.0 \qquad (1)$$

$$c/a \geq 1.5 \qquad (2)$$

$$c \geq 5\mu \qquad (3)$$

and a method for the manufacture of the prismatic dihydrate. Further a method for the manufacture of a coarse dihydrate of calcium hypochlorite carried out by using the prismatic dihydrate of calcium hypochlorite as seed crystal.

13 Claims, 7 Drawing Figures (A)  (B)  (C)

FIG.1 FIG.2
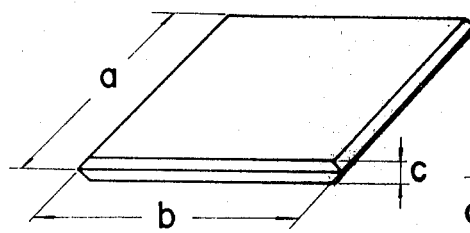
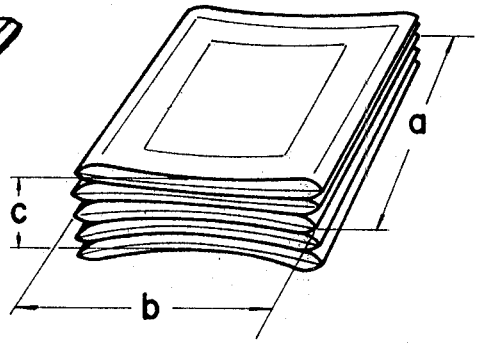
FIG.3
(A) (B) (C)
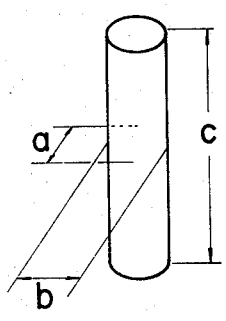
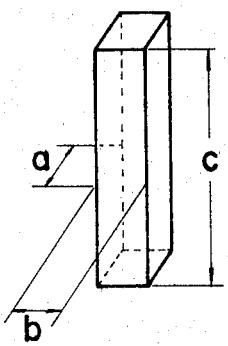
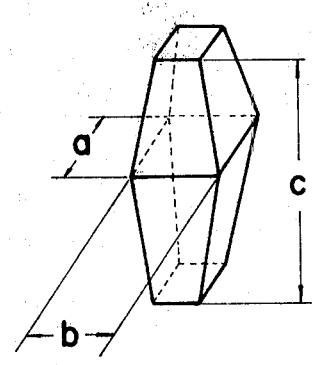

DIHYDRATE OF CALCIUM HYPOCHLORITE AND METHOD FOR MANUFACTURE THEREOF

BACKGROUND OF THE INVENTION (Field of the Invention)

This invention relates to a dihydrate of calcium hypochlorite having a novel shape and to a method for the manufacture thereof and also to a method for the manufacture of a coarse dihydrate of calcium hypochlorite which is carried out with the dihydrate of the novel shape employed as seed crystal. More particularly, the invention relates to a dihydrate of calcium hypochlorite having a prismatic crystal shape in which the lengths of axes a, b and c thereof are in the ratios of:

$$0.5 \leq b/a \leq 2.0$$

$$c/a \geq 1.5$$

and the length of the axis c is at least 5 microns and to a method wherein the prismatic dihydrate of calcium hypochlorite having the lengths of its axes a, b and c in the ratios of:

$$0.5 \leq b/a \leq 2.0$$

$$c/a \geq 1.5$$

and the length of the axis c thereof is at least 5 microns is manufactured by allowing crystallization of the dihydrate of calcium hypochlorite to take place in the presence of one or more than one kind of crystallization medium selected out of a group consisting of carboxylic acid, a carboxylic acid salt and a carbohydrate. The invention also relates to another method wherein a coarse dihydrate of calcium hypochlorite is manufactured by carrying out crystallization of the dihydrate of calcium hypochlorite with the prismatic dihydrate of calcium hypochlorite which has the lengths of its axes a, b and c in the ratios of $$0.5 \leq b/a \leq 2.0$$

$$c/a \geq 1.5$$

and the length of the axis c is at least 5 microns being employed as seed crystal and by allowing the seed crystal to grow.

DESCRIPTION OF THE PRIOR ART

The dihydrate of calcium hypochlorite has long been known as important intermediate or main constituent to be employed in the manufacture of high test hypochlorite, which has been carried out by various methods. However, the dihydrates of calcium hypochlorite obtained by any of the conventionally known methods consist of fine, flat square plate-like crystals and are extremely difficult to separate from their mother liquors.

Therefore, if a dihydrate of calcium hypochlorite which consists of coarse crystals and is readily separable is obtainable, it would permits reduction in fixed and variable costs for the manufacture of high test hypochlorite.

The dihydrate of calcium hypochlorite belongs to a tetragonal system and normally has a flat and square plate-like crystal as mentioned in the foregoing. Further, its crystal has heretofore been called a 2.5 hydrate or a trihydrate. However, this is not correct. The fact is that the crystal of it is a dihydrate.

The present invention will be more readily understood with reference to the accompanying drawings in which: FIG. 1 is a sketch showing a flat, square plate-like crystal. Assuming that the center of the crystal is an origin, the axes in the direction of width, i.e. the direction in which the crystal has better grown, are assumed to be axes a and b and the axis in the direction of thickness, i.e. the direction in which the crystal has grown to a less degree, is assumed to be c, normally the length of the axis a is about equal to that of the axis b while the ratio of the length of the axis c to that of the axis a (hereinafter will be expressed as the ratio of c/a) is less than 0.1. As will be readily understood from its shape, this crystal grows at a much greater speed in the direction of the axes a and b than in the direction of the axis c. The dihydrate of calcium hypochlorite having such a shape is very fragile and can be readily broken into fine particles by a mechanical impact.

The known methods for making the crystal more coarse and larger for improvement in separability include a U.S. Pat. No. 2,469,901, the specification of which discloses a poly-synthetic twin crystal which presents a lamination-like configuration. As shown in FIG. 2, this poly-synthetic twin crystal consists of twin crystals having flat, square plate-like faces symmetrically disposed with the axes a and b in the direction of width and the axis c in the direction of thickness. Normally the lengths of the axes a and b are approximately equal to each other and the ratio of c/a is less than 1.0. In the case, the axis c is the sum of the axes c of the constituent flat, square plate-like crystals. The ratio of c/a of each constituent crystal is less than 0.1. Though this lamination like crystal appears to be coarse and large, there is contained a great amount of a mother liquor between these constituent crystal pieces. The crystal is also very fragile and is easily broken into fine particles by a mechanical impact.

Heretofore, high test hypochlorite in general has been manufactured by separating such flat shaped dihydrate of calcium hypochlorite or crystals of a lamination-like shape from a mother liquor and then by drying the separated crystals. However, the process of separating such crystals has been difficult because the crystals are of a flat shape and there is contained a great amount of the mother liquor between the crystal pieces and that the crystals are extremely fragile. Therefore, for the separation process, it has been necessary either to use a very powerful separator or to carry out the separation process over a long period of time.

However, even with such a separation process carried out, the adhering rate of mother liquor to a wet cake (weight of mother liquor sticking to the wet cake × 100/weight of wet cake) is high. This increases the rate of decomposition of calcium hypochlorite that takes place in the next process of drying and also causes an increase in the energy required for the drying process.

Since these problems can be solved by the manufacture of a dihydrate of calcium hypochlorite that is readily separable, many attempts have been made to solve the problems through various method.

For example, the specification of a U.S. Pat. No. 2,469,901 discloses that a dihydrate of calcium hypochlorite that is readily separable can be obtained by promptly chlorinating a suspension of calcium hydroxide or a suspension consisting of calcium hydroxide and sodium hydroxide with sodium chloride or the like allowed to be concomitant. In accordance with this method, the separability can be improved to some degree. However, most of the crystals thus obtained are poly-synthetic twins presenting a lamination-like configuration. According to the results of tests conducted by the present inventors, the ratio of c/a of such a crystal is less than 1.0. The separability of the dihydrate is not satisfactory and the adhering rate of the mother liquor to the wet cake which is obtained in accordance with the disclosed method exceeds 30% by weight. Further, this method cannot be considered to be an economical manufacturing method. It necessitates complex processing procedures and incurs an increase in the expenses of chemicals required because of the unsafety or the hazard of excessive chlorination due to the prompt chlorinating process; the use of a chemical such as barium chloride for lowering the concentration of sulfate in the solution; and the necessity for accurate adjustment of temperature and the chlorinating speed.

A Japanese patent publication No. 47-26593 discloses a method for obtaining a dihydrate of calcium hypochlorite which is readily separably by allowing an aqueous solution containing calcium ion and hypochlorous acid ion to contain also zinc ion. In accordance with this method, a crystal of a shape that is not in a twin crystal shape can be obtained. The dihydrate thus obtained, however, consists of flat, square plate-like crystals and the ratio of c/a of the crystal is 0.1 or thereabout at the most. The separability improving effect of the method is not much and the adhering rate of a mother liquor to a wet cake obtained by separation is 30 to 35% by weight.

Meanwhile, another Japanese patent publication No. 48-46597 also discloses a method for obtaining a dihydrate of calcium hypochlorite which excels in separability. In this method, calcium hydroxide and an additive selected out of a group consisting of tin ion, strontium ion, and barium ion are added to an aqueous solution which consists of calcium hypochlorite and sodium chloride as main constituents and a chlorinating process is carried out at a temperature between 30° and 50° C. Then, at least 25% by weight of a sodium hypochlorite aqueous solution is added at a temperature between 30° and 50° C. to effect double decomposition thereby. Although the separability can be improved to some degree, the crystal of the dihydrate thus obtained presents either a flat, square plate-like configuration of a poly-synthetic twin crystal not exceeding 1.0 in the ratio of c/a. Thus, this method does not give a fundamental solution of the problems and the dihydrate obtained in accordance with this method has a poor separability and the adhering rate of mother liquor after separation is 30 to 40% by weight. Besides, this method necessitates complex processing procedures and can be hardly considered an economical process.

As described in the foregoing, all of the prior attempts to improve the separability of the dihydrate of calcium hypochlorite have failed to give a fundamental solution of the problems of the conventional dihydrate of calcium hypochlorite. The insufficient separability of a dihydrate of calcium hypochlorite from a mother liquor brings about various problems as shown below:

(1) A load is imposed on a separator. This necessitates use of powerful separators in a greater number of units which in turn cause an increased cost of facilities.

(2) The adhering rate of a mother liquor to a wet cake increases. This makes it impossible to manufacture a high test hypochlorite product having a high effective chlorine content and thus degrades the quality of the product.

(3) The quantity of free water contained in a wet cake increases. This causes an increase in the energy required for drying, an increase in the rate of decomposition of calcium hypochlorite and an increase in quantity of decomposition products contained such as calcium chloride, calcium chlorate, etc. This in turn incurs an increase in variable cost and degraded quality of the product.

(4) In the case of a plate shaped crystal, there is contained a greater quantity of a mother liquor. This causes an increase in the viscosity of a slurry at the time of crystallization. The slurry viscosity, therefore, must be lowered. This necessitates use of a larger apparatus. Further, the circulating quantity of a mother liquor increases. Then, the decomposition quantity of the calcium hypochlorite at the time of the circulation increases.

(5) A calcium hydroxide that contains less quantity of calcium carbonate or the like which becomes a cause for a water insoluble constituent must be employed.

(6) The shape of crystals is caused to become more flat by a continuous manufacturing process. This, among other problems, makes it difficult to carry out the manufacture in a continuous manner.

Known methods for attaining improvement in the above mentioned separability through the use of flat-shaped or lamination-like crystals as seed crystals and by growing the seed crystals include the so-called seed crystal adding method which is disclosed in the specification of a British Pat. No. 487,009 and that of a U.S. Pat. No. 2,469,901. Such a method brings about some effect on the separability.

However, the growing speed of the axes a and b of crystals in accordance with such a method is not so high while the growing speed of the axis c of the crystal is extremely low. Therefore, it is necessary to add the seed crystal in a larqe quantity. Besides, the crystal thus obtained through a growing process also has a flat shape and, accordingly, is so fragile that it is easily broken into fine particles by a mechanical impact. In the case of a lamination-like crystal, there is contained a large quantity of a mother liquor in between one constituent flat crystal and another. In other words, even in accordance with the seed crystal method, the separation of crystals is also difficult in the same manner as in other methods mentioned in the foregoing.

SUMMARY OF THE INVENTION

In an effort to solve the above stated problems, the inventors of the present invention strenuously conducted the studies of the growth of the crystal of a dihydrate of calcium hypochlorite and its separability. Through such studies, they discovered a wonderful fact and, based thereon, have come to complete the present invention. In other words, in the crystallization process of a dihydrate of calcium hypochlorite, the inventors of the present invention found a prismatic crystal of a novel shape which completely differed from the crystals of the conventionally known products. Then, through further studies, they found that a course dihydrate of calcium hypochlorite that was very easily separable from a mother liquor could be obtained by using, as seed crystal, the dihydrate of calcium hypochlorite that had the above stated novel prismatic crystal shape, i.e. the prismatic dihydrate of calcium hypochlorite, and by allowing it to grow. This discovery has led to the present invention.

It is therefore an object of this invention to provide a prismatic dihydrate of calcium hypochlorite having the above stated novel prismatic crystal shape.

It is another object of this invention to provide a method for the manufacture of the above stated prismatic dihydrate of calcium hypochlorite.

It is a further object of this invention to provide a method for the manufacture of a coarse dihydrate of calcium hypochlorite which is carried out with the above stated prismatic dihydrate of calcium hypochlorite employed as seed crystal and with the seed crystal being arranged to grow.

The typical shapes of the novel crystal of the dihydrate obtainable in accordance with the present invention are as illustrated in FIG. 3 of the accompanying drawings. The results of X-ray diffractiometry, thermal analysis and chemical analysis have clearly indicated that the crystal is nothing else but a dihydrate of calcium hypochlorite. Further, the results of experiments in which the crystal of dihydrate has been allowed to grow without having any crystallization medium indicate that the directions of width of the crystal of this invention correspond to the directions of the axes a and b of the conventional crystal and the direction of height corresponds to the direction of the axis c of the conventional crystal. Let us now compare the prismatic crystal of the dihydrate of calcium hypochlorite obtained in accordance with this invention with the conventional crystal in terms of 2θ and relative strength in X-ray diffraction graphs, by way of example. Their peak positions are identical with each other thus showing that they have the same crystalline structure. However, they differ from each other to a great degree in relative strength. This indicates that the crystal growing manner of one completely differs from that of the other.

Further, it is evident that the crystal of the dihydrate of the present invention is a single crystal which is not in a twin crystal shape and is not in a lamination-like poly-synthetic twin crystalline state. In other words, the crystal is a dihydrate of calcium hypochlorite having its axis c grown to an abnormally great extent while the growth of its axes a and b is extremely restricted. The crystal shapes of the calcium hypochlorite dihydrate are as shown in FIG. 3 and include a cylindrical shape as shown in FIG. 3A; a square prismatic shape as shown in FIG. 3B; a square top, double pyramidal shape as shown in FIG. 3C; and shapes intermediate between these shapes. In the present invention, the crystals of these shapes are called by a generic term of "prismatic dihydrate of calcium hypochlorite."

The prismatic crystal has a much greater mechanical strength than the conventional flat, square plate-like crystals and lamination-like crystals. Therefore, the prismatic crystal of the invention remains unbroken through stirring, separating and drying processes.

The crystal is pure having almost no crystallization medium mixed therein and thus has a great stability. The crystal is readily separable from the mother liquor. The adhering rate of the mother liquor to the wet cake does not exceed 30% by weight and sometimes reaches a value as low as 15% by weight. The rate is low as compared with that of the conventional crystals which have the adhering rate of mother liquors to wet cakes above 30% and sometime as high as 50% by weight. Separation can be carried out in a short period of time with an ordinary separator.

Since the adhering rate of the mother liquor to the wet cake is low, a drying process can be easily carried out with a small amount of drying energy. In addition to that, the degree of decomposition of the calcium hypochlorite during the drying process is low so that a high test hypochlorite of a high quality containing only a small amount of a decomposed product can be obtained at a high rate of yield.

Since the crystal is strong and is not readily broken, fine particles are produced only to a very slight degree. This is highly advantageous in terms of hygienic management for the health of operators and other workers. Further, in the crystallizing process of the crystal, the viscosity of slurry is low. This permits to keep the slurry at a high degree of density so that the size of a manufacturing apparatus can be reduced to a compact size.

The prismatic dihydrate of calcium hypochlorite of the present invention, therefore, has a great economic advantage and greatly contribute to reduction in fixed and variable costs and to improvement in quality of products. It is also highly advantageous in terms of hygienic management as mentioned in the foregoing.

Another feature of the prismatic dihydrate of calcium hypochlorite of the present invention lies in that the crystal thereof is an ideal seed crystal. When the prismatic dihydrate of calcium hypochlorite of the invention is used as seed crystal and is allowed to grow, it rapidly grows in the direction of its axes a and b to become a coarse calcium hypochlorite dihydrate which is not in a twin crystal shape. This coarse crystal has a wonderful separability. The sticking rate of mother liquor to the wet cake does not exceed 20% by weight and sometimes reaches a value which is as low as 5% by weight. This is a highly advantageous feature.

The prismatic calcium hypochlorite dihydrate of the present invention in which the lengths of axes a, b and c are in the ratios of $$0.5 \leq b/a \leq 2.0$$

$$c/a \geq 1.5$$

with the length of the axis c thereof exceeding 5 microns and preferably in the ratios of $$0.5 \leq b/a \leq 2.0$$

$$c/a \geq 3.0$$

with the length of the axis c measuring more than 10 microns is obtained by addition of at least one crystallization medium selected out of a group consisting of carboxylic acid, a carboxylic acid salt and a carbohydrate.

Further, to obtain another object of this invention, which is to provide a method for manufacturing a coarse dihydrate of calcium hypochlorite, the above stated prismatic dihydrate of calcium hypochlorite is employed as seed crystal in a known method for crystallizing a dihydrate of calcium hypochlorite.

In accordance with the invented method, the prismatic dihydrate of calcium hypochlorite which has its axis c abnormally grown while the growth of its axes a and b has been extremely restricted is employed as seed crystal. The crystal shapes of the prismatic dihydrate include a cylindrical shape as shown in FIG. 3A; a square prismatic shape as shown in FIG. 3B; a square top double pyramidal shape as shown in FIG. 3C; and intermediate shapes between these shapes. With the prismatic dihydrate of calcium hypochlorite of the invention used as seed crystal in carrying out the invented method, it grows very fast and becomes a coarse dihydrate of calcium hypochlorite in a moment. The rate of growth of its axes a and b is particularly remarkable and the lengths of the axes a and b become twice or three times as much as those of the conventional crystals. The size of the crystal increases with the length of its axis c which grows at a relatively slow rate as compared with the growing rate of the axes a and b.

Accordingly, the ratio of c/a decreases as the growth of the crystal further proceeds and thus the crystal shape is transformed to a square prismatic shape or a square top double pyramidal shape. When the prismatic dihydrate is in its original state as seed crystal, the axis c of it is much longer than that of the conventional crystals. Thus, the thickness of it is large to begin with. Therefore, the grown crystal is not only coarse and large but also thick. Besides, the crystal is not in a twin crystal state. The seed crystal thus grows into a coarse and large dihydrate of calcium hypochlorite that has been undreamed-of with the conventional known methods.

Since the prismatic dihydrate of calcium hypochlorite not only has a very long axis c but also has short axes a and b, the addition quantity of it as seed crystal can be reduced to a very small quantity and, normally, the use of it in quantity less than 20% by weight of the coarse dihydrate of calcium hypochlorite to be obtained suffices. This is, therefore, quite efficient as seed crystal.

In other words, in accordance with the present invention, the drawback of a dihydrate of calcium hypochlorite that the growth of its axis c is very poor is eliminated by the use of the prismatic dihydrate of calcium hypochlorite which has its axis c grown to a great length while the growth of its axes a and b has been restricted to short lengths, so that dihydrate of calcium hypochlorite which is coarse and quite readily separable can be manufactured.

Next, the invented methods for the manufacture of the prismatic dihydrate of calcium hypochlorite and the coarse dihydrate of calcium hypochlorite are described in further detail below:

The crystallization of the dihydrate of calcium hypochlorite can be carried out by any of the known processes (a) through (f) listed below, though any other processes are also usable so long as the dihydrate of calcium hypochlorite can be crystallized thereby:

(a) A crystallizing process to be carried out by chlorinating calcium hydroxide;

(b) a crystallizing process carried out by chlorinating a mixture of calcium hydroxide and sodium hydroxide;

(c) a crystallizing process by mixing an aqueous solution of sodium hypochlorite and that of calcium chloride and thus by carrying out double decomposition;

(d) a crystallizing process by adding a salting-out agent such as sodium chloride to an aqueous solution containing calcium hypochlorite;

(e) a crystallizing process to be carried out by condensing an aqueous solution containing calcium hypochlorite; and (f) a crystallizing process to be carried out through transition of basic calcium hypochlorite.

In carrying out the crystallizing process for the crystallization of the prismatic dihydrate of calcium hypochlorite, at least one kind of a crystallization medium which is selected out of a group consisting of carboxylic acid, a carboxylic acid salt and a carbohydrate is allowed to be present during the crystallization of the prismatic dihydrate of calcium hypochlorite. In the case of crystallization of the coarse dihydrate of calcium hypochlorite, the above stated prismatic dihydrate of calcium hypochlorite (hereinafter will be called the prismatic seed crystal) is allowed to be present as seed crystal. In both cases, however, the crystallizing process (a) or (b) is preferable in terms of economy.

Further, with the crystallizing process (a) or (b) adopted, when a mother liquor which is obtained by separating the prismatic dihydrate of calcium hypochlorite is mixed beforehand with calcium hydroxide and sodium hydroxide, or when the prismatic dihydrate of calcium hypochlorite is manufactured by chlorinating a slurry or the like in which a part of the calcium hydroxide and a part of sodium hydroxide have been chlorinated beforehand, the chlorinated matter thus obtained becomes a double salt of semi-basic calcium hypochlorite, dibasic calcium hypochlorite, calcium hydroxide, calcium chlorite, etc. However, such a double salt does not cause any inconvenience. In the case of the crystallizing process (b), the calcium hydroxide and the sodium hydroxide are normally used approximately in equivalent quantities. However, an excess of sodium hydroxide or a shortage thereof causes no problem. In short, the mol ratio between the calcium hydroxide and the sodium hydroxide can be selected as desired.

In accordance with this invention, carboxylic acid, a carboxylic acid salt or a carbohydrate is usable as crystallization medium. In the case of carboxylic acid or a carboxylic acid salt, a greater effect can be attained by the use of a polybasic carboxylic acid or a polybasic carboxylic acid salt, such as succinic acid, maleic acid, fumaric acid, malic acid, tartaric acid, racemic acid, citric acid, pyromellitic acid, mellitic acid, etc. and their potassium salt, sodium salt, magnesium salt, calcium salt, etc. As for hydroxy-carboxylic acid, a monobasic carboxylic acid such as gluconic acid and a salt thereof may be used. However, use of a polybasic hydroxy-carboxylic acid or a salt thereof brings a greater effect. The carbohydrate may be selected out of a group consisting of glycose, galactose, cane sugar, etc. Further, the crystallization medium of course may be selected either out of compounds that produce carboxylic acid or a salt thereof through reaction with hydrochlorite ion in the mother liquor or out of compounds (for example tributyl citrate) that produce such through hydrolysis.

Some of the compounds such as glucose, etc. accelerates the decomposition of calcium hypochlorite to a considerable degree. In such a case, however, it should be promptly separated from the mother liquor upon completion of crystallization of the prismatic dihydrate of calcium hypochlorite.

One or more of such crystallization medium are added either before crystallization or during crystallization. The concentration of the crystallization medium varies with the method used for the crystallization process, crystallizing temperature, the composition of the mother liquor, the kind of the crystallization medium employed and the slurry concentration of the prismatic dihydrate of calcium hypochlorite to be separated. Normally, however, the concentration is less than 2% by weight of the slurry. The crystallization medium serves to increase a stable supersaturated concentration; to accelerate the growing rate of the crystal in the direction of its axis c; and also to restrict the growth of the crystal in the direction of its axes a and b by being adsorbed to each face of the crystal in these directions in such a way as to form the prismatic dihydrate of calcium hypochlorite.

The crystallizing process is carried out at a temperature between 0° and 40° C. in the same manner as generally practiced and preferably at a temperature between 10 and 30° C. Crystallization at a temperature higher than that must be avoided because the calcium hypochlorite would be decomposed as indicated by Formulas (1) and (2) below:

$$Ca(ClO)_2 \rightarrow CaCl_2 + O_2 \qquad (1)$$

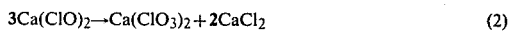

$$3Ca(ClO)_2 \rightarrow Ca(ClO_3)_2 + 2CaCl_2 \qquad (2)$$

In cases where the crystallization is to be carried out through chlorination as in the cases of the crystallizing process (a) or (b), it is necessary to thoroughly remove heat, because a high heat of reaction will be produced in such a case.

The reaction can be carried out either by a continuous process or by a batch process. However, the batch process is preferable, because it gives a higher effect of the crystallization medium and it also facilitates fine adjustment. The batch process is suitable particularly for the manufacture of the prismatic dihydrate of calcium hypochlorite which is to be used as seed crystal. In cases where high test hypochlorite is to be manufactured directly from the prismatic dihydrate of calcium hypochlorite, however, the continuous process is preferable on account of easiness of operation and improvement in productivity.

The reaction is controlled by oxidation-reduction potential or by pH. The pH is adjusted to a value between 8 and 12 and preferably between 9 and 11.

Although formation of the calcium hypochlorite is carried out at a rate of 10 to 500 g/hr.l, the formation velocity varies with the type of the reaction process. In the case of a batch process, preferable formation velocity is between 50 and 300 g/hr.l. Further, in the case of a batch process, the period required before the prismatic dihydrate of calcium hypochlorite begins to crystallize (an induction period) is longer. However, this period can be made shorter by using seed crystals, ultrasonic waves, etc.

The prismatic dihydrate of calcium hypochlorite is manufactured in this manner. The size of the prismatic dihydrate varies over a wide range. Considering the manufacture thereof in its economic aspect, however, a suitable crystal of the prismatic dihydrate has the lengths of its axes a, b and c in the ratios of $$0.5 \leq b/a \leq 2.0$$

$$c/a \geq 1.5$$

with the length of the axis c measuring at least 5 microns and preferably in the ratios of $$0.5 \leq b/a \leq 2.0$$

$$c/a \geq 3$$

with the length of the axis c measuring at least 10 microns. The prismatic dihydrate of such a size and a shape is suitable particularly for use as seed crystal.

The prismatic dihydrate of calcium hypochlorite can be easily separated from the mother liquor by means of a basket type centrifugal separator. After separation, the mother liquor is usable again, so that the manufacture can be econimically carried out. As for drying, a pneumatic conveying drier or a fluidized drier can be used.

On the other hand, crystallization of the coarse dihydrate of calcium hypochlorite will be understood from the following description of an example, which is carried out in accordance with the crystallizing process (a) or (b):

In the process in which either calcium hydroxide or a mixture consisting of calcium hydroxide and sodium hydroxide is chlorinated for crystallizing a dihydrate of calcium hypochlorite, the prismatic seed crystal is added to the dihydrate of calcium hypochlorite in a saturated or super-saturated state. However, it is also possible to add the prismatic seed crystal either in a state of cake or in a state of slurry. Further, the addition of the prismatic seed crystal may be carried out either in a continuous manner or in an intermittent manner. The crystallizing tank to be used for the crystallizing process may be a perfect mixing type, DTB type or a DP type.

The addition quantity of the prismatic seed crystal may be set at an arbitrary quantity. However, considering the manufacturing facilites required for the prismatic seed crystal and also the influence on the particle diameter of the coarse dihydrate of calcium hypochlorite to be produced, the addition quantity is less than 20% by weight of the coarse dihydrate of calcium hypochlorite to be produced and preferably less than 10% by weight. Further, in cases where, the prismatic seed crystal is to be added directly in a state of slurry, the prismatic seed crystal is accompanied by the crystallization medium which has been used in the manufacture of the prismatic seed crystal. However, the accompanying quantity of the crystallization medium is a very slight quantity because of the small addition quantity of the prismatic crystal. Therefore, the growth of the prismatic seed crystal, decomposition of the calcium hypochlorite and the quality of the high test hypochlorite will not be affected by the crystallization medium. However, such a crystallization medium can be completely removed when the prismatic seed crystal is used in a state of cake or by washing it before use.

A crystallization process is normally carried out at a temperature between 5 and 50° C. and preferably between 15° and 40° C. because, at such a temperature, the decomposition of the calcium hypochlorite that takes place as indicated in Formulas (1) and (2) shown in the foregoing can be restrained and also the prismatic seed crystal growing velocity increases at such a temperature.

An apparent crystal residence time is normally arranged to be between 1 and 10 hours. If the residence time is too short, there would be produced a fine dihydrate of calcium hypochlorite. If the residence time is too long, use of a larger crystallizing tank becomes necessary.

The concentration of the coarse dihydrate of calcium hypochlorite, i.e. a slurry concentration, can be increased to a very high value between 10 and 50% by weight because of a much lower slurry viscosity than the conventional processes. However, a preferable concentration is in the range of 20-40% by weight.

The composition of the slurry includes 10-45% and preferably 18-38% by weight of calcium hypochlorite, 8-45% and preferably 10-30% by weight of calcium chloride and 0-20% and preferably 0.3-1.0% by weight of calcium hydroxide. However, in cases where sodium chloride comes to separate together, the concentration of the coarse dihydrate of calcium hypochlorite must somewhat be lowered.

Chlorine is introduced into the crystallizing tank normally in a gaseous state. A suitable rate of introduction is 10 to 200 g/hr.l. The heat of reaction carried out by chlorination is high and thus requires removal of heat to a sufficient degree. Otherwise, the decomposition reaction indicated by Formulas (1) and (2) would vigorously takes place.

Further, if absorption of chlorine is insufficient, there takes place excessive chlorination and then the decomposition reaction indicated by Formula (2) comes to rapidly proceed. Therefore, it is important to control the reaction and the reaction must be kept under strict surveillance in terms of pH or oxidation-reduction potential.

The growth of the prismatic seed crystal takes place to a sufficient degree when the concentration of calcium chloride in the mother liquor is 40% or even 50% by weight. The coarse dihydrate of calcium hypochlorite presents either a square top double pyramidal shape measuring 10 to 1000$\mu$ in lengths of its axes a and b and 5 to 300$\mu$ in length of its axis c or a thick square plate-like shape. The coarse dihydrate of calcium hypochlorite obtained in this manner is separated from the mother liquor. In cases where a great amount of sodium chloride is precipitated, it can be readily removed beforehand through a classifier. The slurry of the coarse dihydrate of calcium hypochlorite is obtained from the upper part of the classifier while the slurry of sodium chloride is obtained from the lower part of the classifier. The slurry of the sodium chloride which contains a small amount of the coarse dihydrate calcium hypochlorite may be separated as it is. However, it is advantageous to separate it after adding an aqueous solution mainly consisting of unsaturated calcium hypochlorite and sodium chloride to the dihydrate of calcium hypochlorite and after the mixed dihydrate of calcium hypochlorite is dissolved as disclosed in a Japanese patent application laying-open No. 52-134895.

On the other hand, the slurry of the coarse dihydrate of calcium hypochlorite may be also separated as it is. However, a high test hypochlorite of a higher quality which contains a less amount of a water insoluble matter can be obtained by first separating a fine dihydrate of calcium hypochlorite, calcium hydroxide, calcium chloride, etc. to obtain a condensed slurry of the coarse dihydrate of calcium hypochlorite. Then, the condensed slurry is readily separable. This method of separation is suitable particularly in cases where calcium hydroxide of a low grade and a chlorine gas of a high carbonic acid concentration are employed. Normally, a basket type centrifugal separator is used for the separating process, which can be carried out in a continuous manner. The separated mother liquor is normally circulated through a mother liquor treating process. However, the mother liquor may be either circulated directly to the crystallization process or purged in part.

The wet cake which is obtained by separation does not have much of the mother liquor adhering thereto and the adhering rate of the mother liquor to the wet cake is less than 20% by weight and above 5% by weight. The wet cake contains 55 to 75% by weight of calcium hypochlorite and 1 to 10% by weight of calcium chloride. The wet cake may be directly dried. However, in the event of a high calcium chloride content in the wet cake having an adverse effect on the quality of the high test hypochlorite product, the calcium chloride can be readily removed by washing with water or an aqueous solution that virtually does not contain therein calcium chloride, such as an aqueous solution of sodium hypochlorite or an aqueous solution of sodium chloride.

The washing process is generally carried out in relation to the separating process using the same separator, so that these processes can be continuously carried out without any difficulty. The washed liquor is normally circulated to the crystallizing process. However, it may be either circulated to a mother liquor treating process or used as diluent for calcium hydroxide. The washed cake which is thus obtained through the washing process contains 55 to 75% by weight of calcium hypochlorite and less than 1% by weight of calcium chloride. For adjustment of the effective chlorine content thereof, it is preferable to mix the wet cake or the washed cake with a diluent such as sodium chloride or the like before drying it. The separated mother liquor and the washed mother liquor may be purged as they are. However, it is economical to introduce them into the crystallizing tank or to make them into a slurry of dibasic calcium hypochlorite by adding calcium hydroxide before introduction into the crystallizing tank, or either to filtrate a part of or the whole of the slurry of the dibasic calcium hypochlorite or to calm it for separation and then the filtrate or the supernatant liquid thus obtained is purged and then to introduce the slurry or the cake of condensed dibasic calcium hypochlorite into the crystallizing tank.

A drying process can be very easily carried out because of the low adhering rate of the mother liquor to the cake and the coarse and large crystal shape thereof. A pneumatic conveying drier or a fluidized drier can be used for drying. The drying process does not require much energy. The decomposing rate of the calcium hypochlorite during the drying process is low. The high test hypochlorite which is obtained through the drying process is of a high quality having effective chlorine content in the range of 50–95%, the effective chlorine content being adjustable as desired. The features and advantages of the coarse dihydrate of calcium hypochlorite obtained in accordance with the present invention are as shown below:

(1) The crystal is quite readily separate from the mother liquor because it is coarse and not in a twin crystal state. As compared with the conventional crystals which have the adhering rate of mother liquor to wet cake at a value at least 30% by weight or sometimes as high as 50% by weight, the adhering rate of the mother liquor in the case of the coarse dihydrate is extremely low and does not exceed 20% by weight and sometimes is only 5% by weight, though it is processed only for a short period of time with a simple separator.

(2) With the adhering rate of the mother liquor to the wet cake being so low, the wet cake does not require much energy for drying. Further, the rate of decomposition of calcium hypochlorite at the time of drying is low to ensure that high test hypochlorite of a high quality can be obtained at a high rate of yield.

(3) The crystal is extremely robust and cannot be readily broken by a mechanical impact thereon, so that the possibility of formation of fine particles decreases to a great degree. This not only contributes to increase in yield but also is highly advantageous for hygienic management because the health of the workers at the manufacturing facilities and other people who are handling the product will not be affected by fine particles.

(4) Since the crystal is coarse and large, viscosity of slurry in the crystallizing process is low. In the case of the conventional crystals, the concentration of slurry is limited to 15% by weight. However, the coarse crystal of the present invention now permits to increase the slurry concentration to a value exceeding 20% by weight and up to a value as high as 40% by weight. This in turn makes it possible to use a compact manufacturing apparatus. Further, since the slurry concentration can be kept at a high value, the mother liquor can be circulated in less quantity to minimize the degree of decomposition of the dihydrate of calcium hypochlorite that takes place during the circulation of the mother liquor.

(5) It is possible to arrange the concentration of the calcium hypochlorite in the wet cake to be up to 98% by weight as reduced to a dried state thereof. In the manufacture of high test hypochlorite, therefore, the effective chlorine content thereof can be easily adjustable within the range from 50 to 95% by weight.

In addition to these features, it is another important feature of the present invention that, even when the concentration of calcium chloride in the mother liquor is between 25 and 50%, the prismatic dihydrate of calcium hypochlorite grows to a sufficient degree for obtaining the coarse dihydrate of calcium hypochlorite.

In the conventional method, dihydrate of calcium hypochlorite becomes poor and weak according as the concentration of calcium chloride increases until it becomes inseparable. Accordingly, it has been necessary either to adopt a two-stage chlorinating method such as a method disclosed in the specification of a British Pat. No. 1,937,230 or to use sodium hydroxide to render the dihydrate separable through crystallization from a mother liquor in which sodium chloride is employed as chloride.

Whereas, in accordance with the present invention, crystallization can be carried out under the condition that the mother liquor in which calcium chloride is used as chloride at a very high concentration. Therefore, chlorination can be completed in one stage of the process. Besides, it is not necessary to use sodium hydroxide which is expensive, because it is possible to use only calcium hydroxide which is not expensive. The amount of mother liquor to be purged can be reduced to a very small quantity by virtue of a by-product calcium chloride and water balance. Further, the concentration of calcium hypochlorite within the purged mother liquor is extremely low, so that the loss of calcium hypochlorite can be kept to a minimal degree.

Although an additional process is required for the manufacture of the prismatic dihydrate of calcium hypochlorite to be employed as seed crystal, this does not require use of a large apparatus because a small addition quantity is necessary for addition of the seed crystal. This requires only a small amount of variable cost.

Further, it has been difficult to carry out the manufacture in a continuous manner. Whereas, the present invention facilitates continuous manufacturing processes to enhance productivity to a great degree.

As mentioned in the foregoing, the advantageous features of the present invention are numerous and salient. The invention has a great economic advantage. The fixed cost and the variable cost of manufacture can be lowered to a great degree. The quality of the product can be heightened. The invention is quite advantageous for hygienic administration. The methods of the present invention are therefore epoch-making for the manufacture of the dihydrate of calcium hypochlorite and that of high test hypochlorite.

These and other objects, advantages and features of the invention will become more apparent as the description proceeds, when considered with the accompanying crawings.

BRIEF DESCRIPTION OF THE DRAWINGS:

FIG. 1 is an illustrative sketch of a dihydrate of calcium hypochlorite having a flat, square plate-like shape.

FIG. 2 is another illustrative sketch of a dihydrate of calcium hypochlorite having a lamination-like shape (a poly-synthetic twin crystal).

FIG. 3A, B and C are illustrative sketches of the prismatic dihydrate of calcium hypochlorite of the present invention, FIG. 3A showing a cylindrical crystal shape; FIG. 3B a square prismatic crystal shape; and FIG. 3C a square top, double pyramidal crystal shape.

1: Mother liquor treatment tank, 2: Calming separation tank, 3: Crystallizing tank, 4A: Separator, 4A': Separator-1, 4A'': Separator-2, 4B: Classifier, 5A: Washer, 5B: Dissolving tank, 6: Hot air drier, 7: Calcium hydroxide, 8: Slurry of dibasic calcium hypochlorite, 10: Slurry of condensed dibasic calcium hypochlorite, 11: Calcium hydroxide, 11'': Sodium hydroxide, 12: Prismatic seed crystal (prismatic dihydrate of calcium hypochlorite), 13: Chlorine gas, 14: Slurry of coarse dihydrate of calcium hypochlorite and sodium chloride crystal, 15: Separated mother liquor, 16: Wet cake, 17: Washing liquid, 18: Washed mother liquor, 19: Washed cake, 20: Diluent, 21: High test hypochlorite, 22: Slurry of crude sodium chloride, 23: Slurry of pure sodium chloride, 24: Separated mother liquor A.

DETAILED DESCRIPTION OF THE PREFERRED EMBODIMENTS

The present invention is described further by the following embodiment examples and comparison examples. However, it is to be understood that the invention is not limited in its application to these embodiments. In the following description, "%" means percent by weight.

EMBODIMENT EXAMPLE 1

First, 2.5 parts of sodium citrate dihydrate, 250 parts of calcium hydroxide powder and 750 parts of water were introduced into a crystallizing tank which is of a capacity of 2 liters and is equipped with a stirrer. The tank was kept at 20° C. while 227 parts of chlorine gas was blown into the tank at a rate of about 100 g/hr.l.

After completion of chlorination thus effected, stirring was continued for about 24 hours while keeping the tank temperature at 20° C. Then, a dihydrate of calcium hypochlorite of a prismatic crystal shape which was close to a cylindrical shape measuring 5 to 20 microns in length of its axes a and b and 10 to 40 microns in its axis c with the ratio of c/a being about 2 and which was not in a twin crystal state was obtained.

Figure 4:
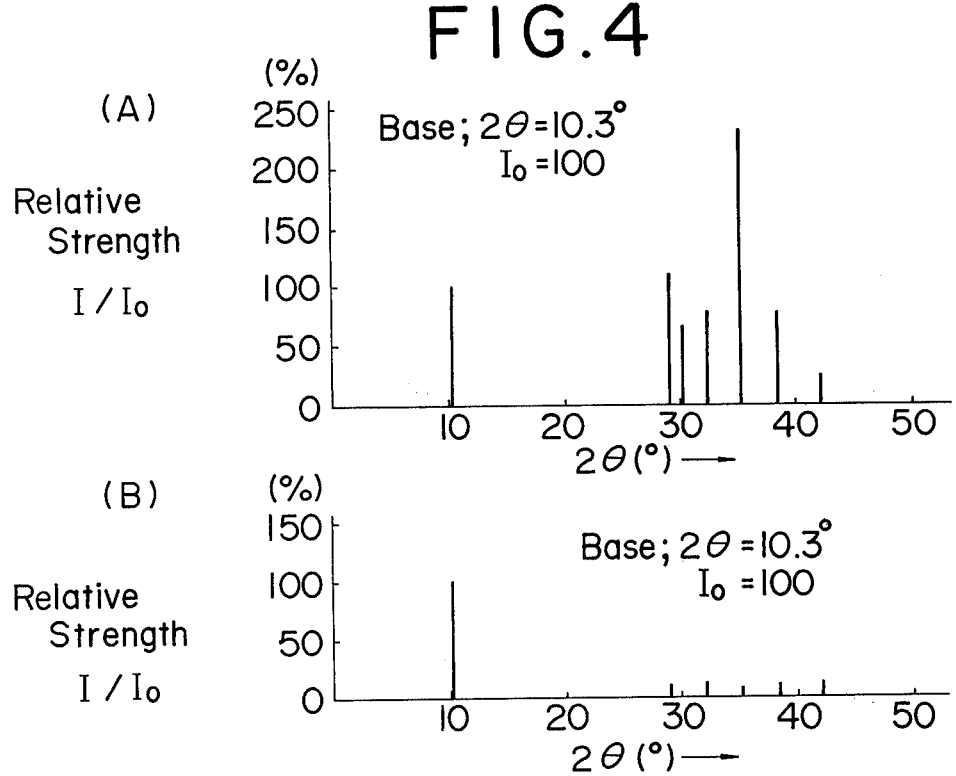
FIG. 4 is an X-ray diffraction graph showing $2\Theta$ and relative strength in relation to each other, FIG. 4A showing the cylindrical-shaped dihydrate of calcium hypochlorite of the invention and FIG. 4B a flat, square plate-shaped dihydrate of calcium hypochlorite.

This crystal (A) and a crystal which was grown in the absence of any crystallization medium were subjected to measurement carried out with the following instrument and under the following conditions:

Instrument: A product of Nihon Denshi KK, JSDX-60S4
X-ray: Cukα . . . Filter: Ni
Intensity: 40 KV, 40 mA
Detector: SC . . . Scanning speed: 2°/min.
Chart speed: 20 mm/min . . . Time constant: 1 sec.
Full scale: 10,000 cps The X-ray diffraction graphs which were obtained through this measurement operation were as shown in FIG. 4. The peak position of one X-ray diffraction graph is the same as that of the other. However, they clearly differ to a great degree from each other in relative strength.

EMBODIMENT EXAMPLES 2-8:

Using each of the various kinds of crystallization medium shown in Table 1, 112 parts of calcium hydroxide, 239 parts of a 48% aqueous solution of caustic soda and 449 parts of water were introduced into a crystallizing tank which was of a capacity of 2 liters and equipped with a stirrer. While the tank was kept at 20° C., 201 parts of chlorine gas was blown into the tank at a rate of about 100 g/hr.l. After completion of chlorination which was thus carried out, stirring was further continued over a period of about 15 hours while the temperature was maintained at 20° C. Through these experiments, prismatic dihydrates of calcium hypochlorite of crystal shapes shown in Table 1 were obtained.

Further, slurries obtained in Examples 4 and 7 were processed with a basket type centrifugal separator to find that the adhering rates of mother liquors of these slurries were 21.0% and 23.0% respectively. Further, the X-ray diffraction graphs of these crystals shown in Table 1 were about the same as the X-ray diffraction graph obtained in Embodiment Example 1.

dium hypochlorite and 8% of sodium chloride were put in a crystallizing tank of a capacity of 2 liters. The tank was kept at 25° C. while 318 parts of a 40% aqueous solution of calcium chloride was introduced into the tank over a period of 30 minutes. By this, a dihydrate of calcium hypochlorite having a prismatic crystal shape close to a cylindrical shape measuring 5 to 30 microns in lengths of its axes a and b and 10 to 60 microns in length of its axis c with the ratio of c/a being about 2 was obtained. A slurry thus obtained was processed with a basket type centrifugal separator to find that the adhering rate of the mother liquor was 25%. Further, the X-ray diffraction graph of this crystal was about the same as the X-ray diffraction graph obtained in Embodiment Example 1.

APPLICATION EXAMPLE 1

A crystallizing tank which was of a capacity of 2 liters and is provided with a slurry extracting part was maintained at a temperature of 20° C. Into the tank which was thus kept at 20° C. were introduced, separately from each other in a continuous manner, a slurry having 30% of calcium hydroxide which was introduced at a rate of 140 parts/hr, a slurry of the prismatic dihydrate of calcium hypochlorite which was obtained in Embodiment Example 8 and was introduced at a rate of 10 parts/hr, and chlorine gas which was introduced at a rate of 52 parts/hr to carry out chlorination. Further, the slurry within the tank was continuously extracted to the outside at a rate of 202 parts/hr. After 50 hours, the dihydrate of calcium hypochlorite within the crystallizing tank was found to have grown into a square top double pyramidal crystal shape measuring 20 to 300 microns in lengths of its axes a and b and 20 to 120 microns in length of its axis c. The slurry containing this dihydrate was processed by a basket type centrifugal separator to find that the adhering rate of the mother liquor was 11%.

Further, although the peak position in an X-ray diffraction graph of the above stated crystal was identical with that of the X-ray diffraction graph obtained in Embodiment Example 1, the relative strength of the former was found somewhat different from the latter.

COMPARISON EXAMPLE 1

An experiment was conducted in exactly the same manner as in Embodiment Example 1 with the excep-

TABLE 1

| Example | Crystallization medium (parts) | | Crystal Axes a & b (μ) | Axis c (μ) | c/a (approx.) | Shape of crystal |
|---|---|---|---|---|---|---|
| 2 | Sodium gluconate | 3 | 5-30 | 10-45 | 1.5 | Prismatic, nearly cylindrical |
| 3 | Pyromellitic anhydride | 3 | 5-20 | 10-30 | 1.5 | Square top double pyramidal |
| 4 | Mellitic acid | 2 | 20-30 | 50-100 | 3.5 | Prismatic, nearly cylindrical |
| 5 | Cane sugar | 3 | 5-20 | 10-30 | 1.5 | Square prismatic |
| 6 | Sodium citrate dihydrate<br>Cane sugar | 2<br>2 | 3-10 | 20-50 | 6 | Nearly square prismatic |
| 7 | Sodium citrate dihydrate<br>Cane sugar | 1.5<br>1.5 | 15-25 | 80-120 | 5 | Nearly square prismatic |
| 8 | Citric acid | 3 | 5-15 | 20-100 | 6 | Nearly cylindrical |

EMBODIMENT EXAMPLE 9

First, 2 parts of a dihydrate of sodium citrate and 682 parts of an aqueous solution consisting of 25% of sotion of that the sodium citrate dihydrate which was used in Embodiment Example 1 was not used in this experiment. Most of the crystals of the dihydrate of calcium hypochlorite obtained by this experiment presented a twin crystal shape measuring 5 to 30 microns in lengths of axes a and b and less than 10 microns in length of the axis c with the ratio of c/a being about 0.15. The slurry containing the dihydrate was processed with a basket type centrifugal separator over a period of 30 minutes to obtain a wet cake. The adhering rate of the mother liquor to the wet cake was 54%.

COMPARISON EXAMPLE 2

An experiment was conducted in exactly the same manner as in Embodiment Examples 2-8 with the exception of that none of the crystallization medium which were employed in these embodiment examples were not used in this experiment. Most of the crystals of the dihydrate of calcium hypochlorite obtained by this experiment presented a twin crystal shape measuring 5 to 50 microns in lengths of its axes a and b and less than 15 microns in length of its axis c with the ratio of c/a being about 0.2. The slurry containing this dihydrate was processed with a basket type centrifugal separator to obtain a wet cake. The adhering rate of the mother liquor to the wet cake was 40%.

EMBODIMENT EXAMPLE 10

Manufacture of the Prismatic Seed Crystal:

Using a crystallizing tank which was of a capacity of 1 liter and was equipped with a stirrer, 35 g of a 10% aqueous solution of sodium gluconate, 112 g of caclium hydroxide, 239 g of a 48% aqueous solution of caustic soda and 449 g of water were put in the crystallizing tank and were kept at a temperature of 15° C. With the temperature kept at 15° C., 201 g of chlorine gas was blown into the tank at a rate of about 150 g/hr.l for chlorination. When the chlorination process was completed, pH was 10.3 and a dihydrate of calcium hypochlorite having a prismatic crystal shape which is close to a cylindrical shape measuring 5 to 25 microns in lengths of its axes a and b and 10 to 50 microns in length of its axis c with the ratio of c/a being about 2 was obtained. This was used as a prismatic seed crystal slurry. The concentration of the slurry was 9.5%.

Figure 5:
FIG. 5 is an optical microscopic picture of the coarse dihydrate of calcium hypochlorite obtained through an experiment which will be described hereinafter among other embodiment examples.

Manufacture of Coarse Dihydrate of Calcium Hypochlorite:

A cylindrical crystallizing tank which was of a capacity of 1 liter and was equipped with a stirrer and overflow tube was used for the experiment. Into this tank were introduced, separately in a continuous manner, while keeping temperature at 30° C., 280 g/hr of a slurry containing 30% of calcium hydroxide, 45 g/hr of the above stated prismatic seed crystal slurry and 105 g/hr of chlorine gas for chlorination. Simultaneously with this, a slurry within the crystallizing tank was extracted to the outside at a rate of 430 g/hr. The prismatic seed crystal was found to have grown well. After 20 hours, a slurry of a coarse dihydrate of calcium hypochlorite having a crystal shape close to a square top double pyramidal shape was obtained. The coarse crystal thus obtained measured 20 to 200 microns in lengths of its axes a and b bnd 10 to 60 microns in length of its axis c. FIG. 5 shows an optical microscopic picture of the coarse dihydrate of calcium hypochlorite which was obtained by this embodiment example. The slurry was processed with a basket type centrifugal separator at 3000 r.p.m. for 3 minutes to obtain a wet cake. The adhering rate of the mother liquor to the wet cake was 17.5%.

EMBODIMENT EXAMPLE 11

Manufacture of the Prismatic Seed Crystal:

An experiment was conducted in exactly the same manner as in Embodiment Example 10 with the exception of that 3 g of mellitic acid was used in place of 35 g of the 10% aqueous solution of sodium gluconate which was used in Embodiment Example 10. A dihydrate of calcium hypochlorite which was obtained by this experiment had a prismatic crystal shape close to a cylindrical shape measuring 5 to 15 microns in lengths of its axes a and b and 20 to 100 microns in length of its axis c with the ratio of c/a being about 6. This was used as prismatic seed crystal in a state of a slurry, the concentration of which was 9.8%.

Manufacture of Coarse Dihydrate of Calcium Hypochlorite:

The same crystallizing tank as in Embodiment Example 10 used used. Into this tank were introduced, separately in a continuous manner, 76.9 g/hr of an aqueous solution consisting of 4.0% of $Ca(ClO)_2$ and 36.0% of $CaCl_2$; 88.6 g/hr of a slurry containing 40% of calcium hydroxide; 33.1 g/hr of chlorine gas; and 8.42 g/hr of the above stated slurry of the prismatic seed crystal. The crystallizing tank was kept at 30° C. while these matters were introduced thereinto. Simultaneously with this, a slurry within the tank was extracted to the outside at a rate of 207 g/hr. The prismatic seed crystal grew well. After 45 hours and within an apparent crystal residence time of 5 hours, there was produced a slurry of a coarse dihydrate of calcium hypochlorite which had a crystal shape close to a square top double pyramidal shape measuring 20 to 400 microns in lengths of its axes a and b and 20 to 120 microns in its axis c.

The slurry of this coarse dihydrate of calcium hypochlorite was subjected to a separating process which was carried out with a basket type centrifugal separator at 3000 r.p.m. for one minute. Then, a washing process was carried out for two minutes to obtain a washed cake consisting of 69.5% of $Ca(ClO)_2$ and 0.5% of $CaCl_2$. The washing liquid was water which was used in quantity of 73% of the washed cake.

EMBODIMENT EXAMPLE 12

Manufacture of Prismatic Seed Crystal

An experiment was conducted in exactly the same manner as in Embodiment Example 11 to obtain a dihydrate of calcium hypochlorite which was of a prismatic crystal shape close to a cylindrical shape measuring 5 to 15 microns in lengths of its axes a and b and 20 to 90 microns in length of its axis c with the ratio of c/a being about 6. This was used as seed crystal. The concentration of the slurry of the seed crystal was 10.0%.

Manufacture of Coarse Dihydrate of Calcium Hypochlorite

The same crystallizing tank that was used in Embodiment Example 10 was used also in this experiment. Into this tank were introduced, separately in a continuous manner while the tank was kept at 30° C., 140 g/hr of a crude slurry consisting of 30% of calcium hydroxide and 3% of calcium carbonate; 10 g/hr of the slurry of the above stated seed crystal; and 52 g/hr of chlorine gas for chlorination. Simultaneously with this, a slurry within the crystallizing tank was extracted to the outisde at a rate of 202 g/hr. The prismatic seed crystal grew well. After 48 hours, there was produced a slurry of a dihydrate of calcium hypochlorite having a coarse crystal shape which was close to a square top double pyramidal shape measuring 20 to 300 microns in lengths of its axes a and b and 20 to 100 microns in length of its axis c. The slurry contained 2.3% of $CaCO_3$.

The slurry of the coarse dihydrate of calcium hypochlorite was processed with a settler. Then, a condensed slurry consisting of 42% of the coarse dihydrate of calcium hypochlorite and 1.5% of $CaCO_3$ was obtained from the lower part of the settler. This slurry was processed with a basket type centrifugal separator at 3000 r.p.m. for one minute to obtain a wet cake which had 14.5% of the mother liquor adhering thereto and 1.8% of $CaCO_3$. On the other hand, the slurry without condensation by settler was separated in exactly the same manner to obtain a wet cake which had 18.0% of mother liquor adhering thereto and 3.5% of $CaCO_3$.

EMBODIMENT EXAMPLE 13

Manufacture of Prismatic Seed Crystal

Using a crystallizing tank which was of a capacity of 1 liter and was equipped with a stirrer, 35 g of a 10% aqueous solution of citric acid and 772 g of a slurry containing 26% of calcium hydroxide were introduced into the tank. Then, while the tank was kept at 20° C., 183 g of chlorine gas was blown into the tank at a rate of about 100 g/hr.l for chlorination. After completion of chlorination, the tank was kept overnight at 20° C. with stirring. By this, there was produced a dihydrate of calcium hypochlorite of a prismatic crystal shape which was close to a cylindrical shape measuring 5 to 20 microns in lengths of its axes a and b and 30 to 100 microns in length of its axis c with the ratio of c/a being about 5. The slurry of this dihydrate was used as prismatic seed crystal slurry. The concentration of the prismatic dihydrate of calcium hypochlorite, i.e. the slurry concentration, was 10.3%.

Figure 6:
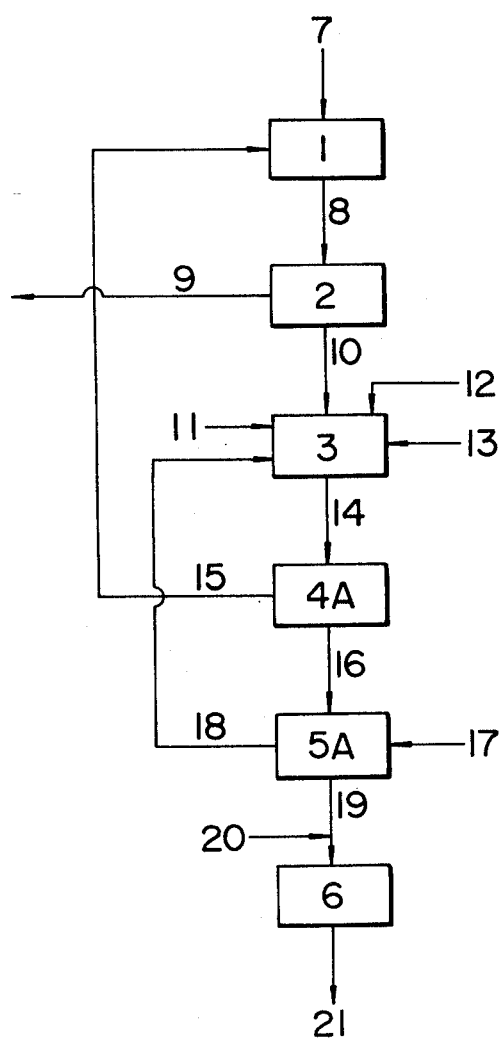
FIG. 6 and 7 are flow sheets showing embodiments of the present invention, wherein reference numerals indicate.

Manufacture of Coarse Dihydrate of Calcium Hypochlorite:

Referring to FIG. 6, the manufacturing process shown in FIG. 6 was carried out as follows:

A mother liquor treatment tank 1 which was of a capacity of 1 liter and was equipped with a stirrer and an overflow tube was used. Into this treatment tank were introduced, separately and in a continuous manner, 907 g/hr of a separated mother liquor 15, which consisted of 5.0% of $Ca(ClO)_2$ and 32.1% of $CaCl_2$; and 63.0 g/hr of a cake consisting of 50% of calcium hydroxide 7 to have a dibasic calcium hypochlorite formed therein. Simultaneously with this, a slurry 8 of the dibasic calcium hypochlorite was obtained from the overflow tube at a rate of 970 g/hr and was continuously introduced into a calming separation tank 2.

Then, from the upper part of the calming separation tank 2, a supernatant liquid containing 1.8% of $Ca(ClO)_2$ and 32.0% of $CaCl_2$ was continuously taken out at a rate of 485 g/hr. On the other hand, from the lower part of the calming separation tank 2, a slurry 10 of condensed dibasic calcium hypochlorite was continuously taken out at a rate of 485 g/hr. The supernatant liquid 9 was completely purged away.

The whole quantity of the slurry 10 of the condensed dibasic calcium hypochlorite was continuously introduced into a crystallizing tank 3 which was of a capacity of 5 liters and was equipped with a stirrer and an overflow tube. Separately from the slurry 10, a mixture consisting of 178 g/hr of washed mother liquor 18 and 305 g/hr of a 50 % calcium hydroxide cake 11 was also continuously introduced into the tank 3. Then, simultaneously with this, the above stated prismatic seed crystal slurry 12 was introduced at a rate of 46.4 g/hr while chlorine gas 13 was also introduced at a rate of 171 g/hr for chlorination.

The inside of the crystallizing tank 3 was kept at 20° C. Chlorination was controlled by oxidation-reduction potential. The prismatic seed crystal 12 grew well and, after a period of 50 hours, a slurry 14 of a coarse dihydrate of calcium hypochlorite having a crystal shape which was not in a twin crystal state and was close to a square top double pyramidal shape measuring 30 to 400 microns in lengths of its axes a and b and 30 to 130 microns in its axis c was continuously obtained from the overflow tube at a rate of 1186 g/hr. The slurry 14 of the coarse dihydrate of calcium hypochlorite was processed with a basket type centrifugal separator 4A at 3000 r.p.m. for one minute to obtain a wet cake 16. Then, the whole quantity of a separated mother liquor 15 which was thus obtained was circulated to the mother liquor treatment tank 1. Following this, the wet cake 16 was washed with water which was used as washing liquid 17 by using a washer 5A for one minute. After washing, a shaking off process was carried out for one minute. The whole quantity of the washed mother liquor 18 thus obtained was circulated as diluent for a 50% calcium hydroxide 11 and was introduced into the crystallizing tank 3. The quantity of the water used for washing was 56% of the washed cake 19. The washed cake 19 was obtained through washing at a rate of 229 g per hour and contained 69.0% of $Ca(ClO)_2$ and 0.3% of $CaCl_2$. Then, 156 g of sodium chloride powder was added as diluent 20 to 1 Kg of the washed cake 19. They were mixed together. The mixture was processed by a hot air drier 6 to obtain a high test hypochlorite powder 21, which contained 75.3% of effective chlorine.

EMBODIMENT EXAMPLE 14

Manufacture of Prismatic Seed Crystal:

First, 4 g of a dihydrate of sodium citrate, 112 g of calcium hydroxide, 239 g of a 48% aqueous solution of caustic soda and 449 g of water were introduced into a crystallizing tank which was of a capacity of 1 liter and was equipped with a stirrer. The inside of the crystallizing tank was kept at 20° C. while 201 g of chlorine gas was blown into the tank at a rate of about 100 g/hr.l for chlorination. After completion of chlorination, stirring was carried on overnight with the temperature still kept at 20° C. By this, a slurry of the prismatic seed crystal containing 10% of a prismatic dihydrate of calcium hypochlorite was obtained. The prismatic dihydrate had a prismatic crystal shape measuring 5 to 15 microns in lengths of its axes a and b and 20 to 80 microns in length of its axis c with the ratio of c/a being about 5.

Figure 7:
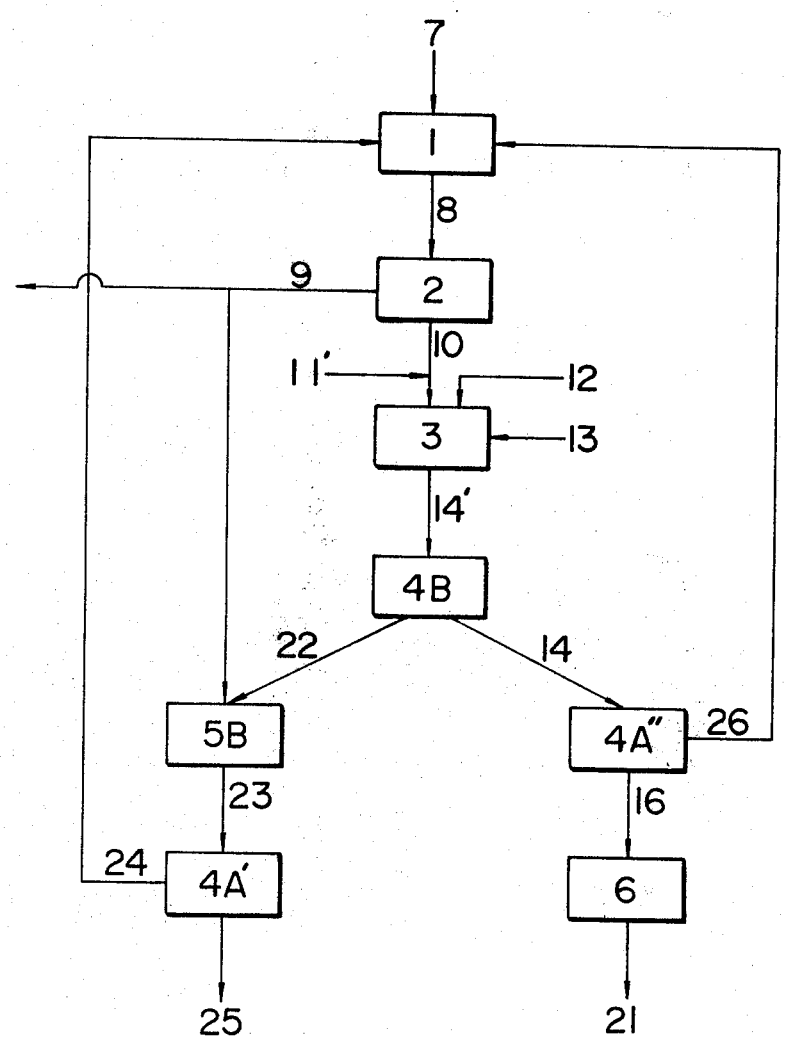

Manufacture of Coarse Dihydrate of Calcium Hypochlorite:

The manufacture of the coarse dihydrate of calcium hypochlorite was carried out in accordance with the procedures shown in FIG. 7. A mother liquor treatment tank 1 which is of a capacity of 1 liter and was equipped with an overflow tube and a stirrer was used. To this tank were introduced, separately and in a continuous manner, 568 g/hr of a separated mother liquor-A 26 which contained 10.0% of $Ca(ClO)_2$ and 20.0% of NaCll 337 g/hr of a separated mother liquor-B 24 which contained 9.0% of $Ca(ClO)_2$ and 21.0% of NaCll and 111 g/hr of a 50% calcium hydroxide cake 7. A slurry 8 of a dibasic calcium hypochlorite which was thus produced was introduced through the overflow tube into a calming separation tank 2 at a rate of 1016 g/hr.

Then, a supernatant liquid 9 containing 4.0% of Ca(ClO)$_2$ and 20% of NaCl was obtained at a rate of 454 g/hr and a slurry 10 of condensed dibasic calcium hypochlorite at a rate of 562 g/hr. A part of the supernatant liquid 9 was purged while a part thereof was circulated to a dissolving tank 5B.

Following this, a 48% aqueous solution 11' of caustic soda was added to the slurry 10 of the condensed dibasic calcium hypochlorite to make it into a slurry of fine calcium hydroxide and was continuously introduced together with 28 g/hr of a cake of 50% calcium hydroxide into a crystallizing tank 3 which was kept at 20° C. and was equipped with a stirrer. Simultaneously with this, 175 g/hr of chlorine gas 13 and 40.8 g/hr of the above stated slurry of the prismatic seed crystal 12 were continuously introduced into the tank 3. The seed crystal 12 grew well and a slurry 14' consisting of a mixture of coarse calcium hypochlorite and sodium chloride was taken out continuously at a rate of 1067 g/hr. The composition of the slurry included 22.3% of Ca(ClO)$_2$ and 24.3% of NaCl. The coarse dihydrate of calcium hypochlorite which was thus obtained had a crystal shape close to a square top double pyramidal shape, without any twin crystalline feature, measuring 20 to 500 microns in lengths of its axes a and b and 20 to 100 microns in length of its axis c. On the other hand, the sodium chloride was of a cubic or spherical shape measuring 100 to 2000 microns. The mixture slurry 14' was introduced into a cylindrical classifier 4B. The ascending flow rate inside the classifier 4B was 17 cm/min. A slurry 22 of crude sodium chloride was taken out from the lower part of the classifier 4B at a rate of 235 g/hr and the slurry 14 of coarse calcium hypochlorite from the upper part at a rate of 832 g/hr. The slurry of crude sodium chloride contained 50% of a coarse dihydrate of calcium hypochlorite. The supernatant liquid 9 which was unsaturated with dihydrate of calcium hypochlorite was added to the slurry 22 at a rate of 182 g/hr to dissolve it almost completely at a dissolving tank 5B. A slurry 23 of the crude sodium chloride which was thus obtained was processed with a basket type centrifugal separator 4A' for one minute to obtain a cake 25 of sodium chloride at a rate of 79 g per hour. The whole quantity of a separated mother liquor-B 24 thus obtained was circulated to the mother liquor treatment tank 1.

On the other hand, the slurry 14 of the coarse calcium hypochlorite was processed with a basket type centrifugal separator 4A'' for one minute to obtain a wet cake 16 at a rate of 264 g per hour. The wet cake had 14.4% of the mother liquid adhering thereto and consisted of 59.7% of Ca(ClO)$_2$ and 13.5% of NaCl.

The whole of the separated mother liquor-A 26 was circulated to the mother liquor treatment tank 1. The wet cake 16 was processed with a hot air drier 6 to obtain a high test hypochlorite powder 21 which had an effective chlorine content of 75.0%.

COMPARISON EXAMPLE 3

An experiment was conducted in exactly the same manner as in Embodiment Example 10 with the exception of that the prismatic seed crystal slurry which was used in Embodiment Example 10 was not used in this experiment. The dihydrate of calcium hypochlorite which was thus obtained presented a flat irregular plate-like crystal shape measuring 5 to 150 microns in lengths of its axes a and b and less than 5 microns in length of its axis c. The slurry of this dihydrate of calcium hypochlorite was processed with a basket type centrifugal separator at 3000 r.p.m. for 10 minutes to obtain a wet cake. The adhering rate of the mother liquor to the wet cake was 51%.

What is claimed is:

1. A dihydrate of calcium hypochlorite having a prismatic crystal shape wherein the lengths of axes a, b and c thereof are in the ratios of $0.5 \leq b/a \leq 2.0$ $c/a \geq 1.5$ with the axis c thereof measuring at least 5 microns in length.

2. A method for manufacturing a prismatic dihydrate of calcium hypochlorite wherein, in crystallizing a dihydrate of calcium hypochlorite, dihydrate of calcium hypochlorite having a prismatic crystal shape with the lengths of the axes a, b and c thereof in the ratios of $0.5 \leq b/a \leq 2.0$ $ca \geq 1.5$ with the axis c thereof measuring at least 5 microns in length is allowed to crystallize in the presence of at least one kind of a crystallization medium selected out of a group consisting of carboxylic acid, an alkali metal salt of carboxylic acid and a carbohydrate.

3. A method for manufacturing a prismatic dihydrate of calcium hypochlorite according to claim 2, wherein said crystallization medium is a polybasic carboxylic acid.

4. A method for manufacturing a prismatic dihydrate of calcium hypochlorite according to claim 2, wherein said crystallization medium is a polybasic carboxylic acid salt.

5. A method for manufacturing a prismatic dihydrate of calcium hypochlorite according to claim 2, wherein said crystallization medium is glucose.

6. A method for manufacturing a prismatic dihydrate of calcium hypochlorite according to claim 2, wherein said crystallization medium is cane sugar.

7. A method for manufacturing a prismatic dihydrate of calcium hypochlorite according to claim 2, wherein said crystallization medium is galactose.

8. A method for manufacturing a prismatic dihydrate of calcium hypochlorite according to claim 2, wherein said prismatic dihydrate of calcium hypochlorite is allowed to crystallize by a crystallizing process which is carried out by chlorinating a mixture slurry consisting of sodium hydroxide and calcium hydroxide.

9. A method for manufacturing a prismatic dihydrate of calcium hypochlorite according to claim 2, wherein said prismatic dihydrate of calcium hypochlorite is allowed to crystallize by a crystallizing process which is carried out by chlorinating milk of lime.

10. A method for manufacturing a prismatic dihydrate of calcium hypochlorite according to claim 2, wherein said prismatic dihydrate of calcium hypochlorite is allowed to crystallize by a crystallizing process which is carried out with a mixture consisting of an aqueous solution of sodium hypochlorite and an aqueous solution of calcium chloride.

11. A method for manufacturing a coarse dihydrate of calcium hypochlorite wherein a calcium hypochlorite dihydrate crystallizing process is carried out with addition of a prismatic dihydrate of calcium hypochlorite which is employed as seed crystal, said prismatic dihydrate being of a crystal shape having the lengths of the axes a, b and c thereof in the ratios of $0.5 \leq b/a \leq 2.0$ $c/a \geq 1.5$ with the axis c thereof measuring at least 5 microns in length.

12. A method for manufacturing a coarse dihydrate of calcium hypochlorite according to claim 11, wherein said calcium hypochlorite dihydrate crystallizing process is carried out by adding calcium hydroxide to an aqueous solution mainly containing calcium hypochlorite and/or calcium chloride and carrying out chlorination.

13. A method for manufacturing a coarse dihydrate of calcium hypochlorite according to claim 11, wherein said calcium hypochlorite dihydrate crystallizing process is carried out by adding calcium hydroxide and sodium hydroxide to an aqueous solution mainly containing calcium hypochlorite and/or sodium chloride and carrying out chlorination.

* * * * *

UNITED STATES PATENT AND TRADEMARK OFFICE
CERTIFICATE OF CORRECTION

PATENT NO. : 4,248,848
DATED : February 3, 1981
INVENTOR(S) : MURAKAMI ET AL

It is certified that error appears in the above-identified patent and that said Letters Patent are hereby corrected as shown below:

Column 1, line 33: before "crystallization" insert --a--.

Column 17, line 12: delete "Examples 2-8" and insert therefor --Example 2--.

Column 17, line 13: delete "none of"

Column 17, line 14: delete "were" and insert therefor --was--; delete "these" and insert therefor --this--; and delete "examples" and insert therefor --example--.

Column 17, line 15: delete "were" and insert therefor --was--.

Column 21, line 40, delete "crude" and insert therefor --pure--.

Signed and Sealed this

Twenty-fourth Day of November 1981

[SEAL]

Attest:

GERALD J. MOSSINGHOFF

Attesting Officer    Commissioner of Patents and Trademarks